US006223254B1

United States Patent
Soni (10) Patent No.: US 6,223,254 B1
(45) Date of Patent: Apr. 24, 2001

(54) PARCEL CACHE

(75) Inventor: Naresh Soni, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/205,998

(22) Filed: Dec. 4, 1998

(51) Int. Cl.$^7$ .................................................. G06F 12/00
(52) U.S. Cl. ..................... 711/125; 711/123; 712/210; 712/211; 712/212; 712/213
(58) Field of Search ................................... 711/125, 123; 712/210, 213, 211, 212

(56) References Cited

U.S. PATENT DOCUMENTS

| 5,689,672 | * | 11/1997 | Witt et al. ........................ | 712/213 |
| 5,867,682 | * | 2/1999 | Witt et al. ........................ | 712/210 |

FOREIGN PATENT DOCUMENTS

| 0459 232 A2 | 12/1991 | (EP) | ................................. G06F/9/38 |
| 0737 914 A1 | 4/1995 | (EP) | ................................ G06F/9/318 |
| 2 293 670 | 3/1996 | (GB) | ................................. G06F/9/32 |

OTHER PUBLICATIONS

Franklin et al., "A Fill Unit Approach to Multiple Instruction Issue", Proc. 27th Intl. Symp. on Microarchitecture, 1994, pp. 162–171.

Tom R. Halfhill, "Emulation: RISC's Secret Weapon", *BYTE*, Apr., 1994, pp. 119–120, 122, 124.

IBM Technical Disclosure Bulletin, "Selecting Predecoded Instructions with a Surrogate", V. 36, No. 6A, pp. 3.

* cited by examiner

*Primary Examiner*—Do Yoo
*Assistant Examiner*—Mehdi Namazi
(74) *Attorney, Agent, or Firm*—Mario J. Donato, Jr.; Theodore E. Galantha; Lisa K. Jorgenson (57) ABSTRACT

The present invention utilizes a cache which stores various decoded instructions, or parcels, so that these parcels can be made available to the execution units without having to decode a microprocessor instruction, such as a CISC instruction, or the like. This increases performance by bypassing the fetch/decode pipeline stages on the front end of the microprocessor by using a parcel cache to store previously decoded instructions. The parcel cache is coupled to the microprocessor fetch/decode unit and can be searched during an instruction fetch cycle. This search of the parcel cache will occur in parallel with the search of the microprocessor instruction cache. When parcel(s) corresponding to the complex instruction being fetched are found in the parcel cache a hit occurs and the corresponding micro-ops are then sent to the execution units, bypassing the previous pipeline stages. The parcel cache is dynamic and will use a replacement algorithm, such as least recently used, to determine how long the parcels will remain in the cache.

11 Claims, 3 Drawing Sheets

PARCEL CACHE

BACKGROUND OF THE INVENTION

1. Field of the Invention

The present invention relates to increasing the speed and efficiency of a microprocessor while maintaining its compatibility with the instruction set architecture. More particularly, the present invention is a technique for decreasing the utilization of processing resources needed to execute particular microprocessor instructions. A parcel cache is provided which stores decoded instructions, i.e. parcels or micro-ops. This allows the decode mechanism in the microprocessor to retrieve a micro-op from the parcel cache and eliminates the necessity of repeatedly decoding often used instructions, such as those which are associated with loop and repeat operations.

2. Description of Related Art

In the computer industry there is a constant demand for ever faster and more efficient systems. Computer processing efficiency is largely dependent on the speed and resource utilization of the microprocessor that controls the basic functions of the computer system. Those microprocessors manufactured by the Intel Corporation execute a specific microprocessor instruction set architecture (ISA), also commonly referred to as x86 instructions. Other Intel (ISA) compatible microprocessors include those manufactured by Advanced Micro Devices, Inc., National Semiconductor and others. These Intel ISA microprocessors command a huge percentage of the marketplace and have caused a correspondingly large amount of software to be written for them. Due to this large amount of Intel ISA software, microprocessor developers cannot change the programmer visible aspects of the instruction set, since it may cause this large quantity of existing software (legacy software) to become inoperable.

Therefore, a challenge to microprocessor developers has been to improve the efficiency of the microprocessor without changing the manner in which the ISA is implemented on the processor. For example, many instructions in the Intel architecture require sub-operations to be performed before the instruction can be completed. If the number of sub-operations, i.e. micro-ops, can be minimized or their performance optimized, without changing the ISA or programmer visible registers, then performance of the microprocessor can be enhanced.

Typically, instructions in the Intel ISA are complex. Therefore, a lot of transistors and time are spent on decoding an x86 CISC (complex instruction set computer) instruction into a simpler RISC (reduced instruction set computer) operation (micro-op or instruction parcel). The motivation for converting an x86 instruction into a RISC operation is to remove the variable length instruction nature of an Intel ISA instruction and simplify the execution engine. The x86 instructions are complex because they tend to perform a lot of work in a single instruction. That is, each CISC instruction has a substantial amount of functionality encoded therein. In addition, to achieve good code density, these instructions are coded using variable opcode lengths. Hence, the complexity of x86 instructions puts a large burden on the front end of the processor pipeline with respect to logic complexity, timing and number of pipeline stages. A Pentium II processor (Pentium is a trademark of Intel Corporation) uses five (5) pipeline stages to fetch and decode the CISC x86 instructions. These 5 stages are a significant number of the total pipeline stages for the microprocessor operation.

Some of the complex instructions in the Intel ISA which perform a substantial amount of work and correspondingly require a lot of fetching and decoding overhead include LOOP, $LOOP_{cc}$, REP, REPZ, REPNZ and REP MOVS instructions. These instructions will decrement a value in a register, such as a general purpose register (GPR) or the like and then make a comparison to determine if the resulting value is equal to zero. For example, each time the LOOP instruction is executed a count register is decremented and checked for zero. If the count equals zero, then the loop is terminated and program execution continues with the instruction following the LOOP. When the count is not zero, a jump (branch) is performed to a destination operand or instruction at a target address, usually the first instruction in the loop. The LOOP instruction does not modify the programmer visible condition code(s) in the flags register. The LOOP instruction will decrement a count register (ECX or CX) and then perform a comparison to see if the value is equal to zero. Whether the ECX or CX register is used depends on the size of the address. For 32 bit applications ECX is used and for 16 bit applications CX is used. Thus, the comparison operation will need to check at least 16 and possibly 32 locations which requires significant processing resources, such as hardware logic needed to perform the actual compare finction. The $LOOP_{cc}$ instruction also decrements the (E)CX register and compares the decremented value to zero, but allows the loop to be exited early by checking a condition code in the flags register. In either case, the compare logic is required to check the decremented value in the (E)CX register with zero. Similarly, the REP instruction(s) will decrement the count register (E)CX and repeat a string operation, e.g. load string, while the value is not equal to zero.

It can be seen that each of these complex instructions must be fetched and may be decoded into multiple micro-ops, or parcels each time the instructions in the loop are iteratively processed or the string instructions are repeated. Each iteration will require the five (5) stage fetch/decode pipeline to be entered causing a significant amount of processing resources to be expended.

Thus, in conventional systems a significant amount of the processor resources must be used to fetch and decode the complex x86 instructions. Particularly in the case of repetitive type instructions, a substantial increase in efficiency could be realized if the fetch and decode resources were not required to continuously process the same instructions at the expense of other instructions waiting to be fetched.

Therefore, it can be seen that a need exists for a microprocessor that executes the Intel instruction set architecture and maintains compatibility with software written for the Intel ISA, while efficiently executing those instructions using less hardware resources.

In particular it would be advantageous for a microprocessor to be able to fetch a complex instruction and decode that instruction into associated RISC micro-operations and store the micro-ops in an easily accessible memory for later use. Thus, the overhead of continually re-fetching and decoding various complex instructions can be saved and overall microprocessor efficiency increased.

SUMMARY OF THE INVENTION

In contrast to the prior art, the present invention utilizes a cache which stores various decoded instructions, or parcels, so that these parcels can be made available to the execution units without having to decode a microprocessor instructions, such as a CISC instruction.

Broadly, the present invention increases performance by bypassing the fetch/decode pipeline stages on the front end of the microprocessor by using a parcel cache to store previously decoded instructions. The parcel cache is coupled to the microprocessor fetch/decode unit and can be searched during an instruction fetch cycle. This search of the parcel cache will occur in parallel with the search of the microprocessor instruction cache. When a parcel(s) corresponding to the complex microprocessor instruction being fetched is found in the parcel cache a hit occurs and the corresponding micro-ops are then provided to the execution units, bypassing the previous pipeline stages. The parcel cache is dynamic and will use a replacement algorithm, such as least recently used (LRU), to determine how long the parcels will remain in the cache. The microprocessor fetch/decode unit (s) will be modified to provide for storing the decoded parcels in the cache and to allow the parcel cache to be searched in parallel with the L 1 instruction cache. In this manner, the present invention improves performance by minimizing the amount of hardware resources (i.e. fetch/decode logic) utilized while maintaining compatibility with the Intel architecture since the programmer visible elements, e.g. flags, registers, or the like are not altered. By leaving the programmer visible elements unchanged, the software is not forced to save and restore the register contents during each operation.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
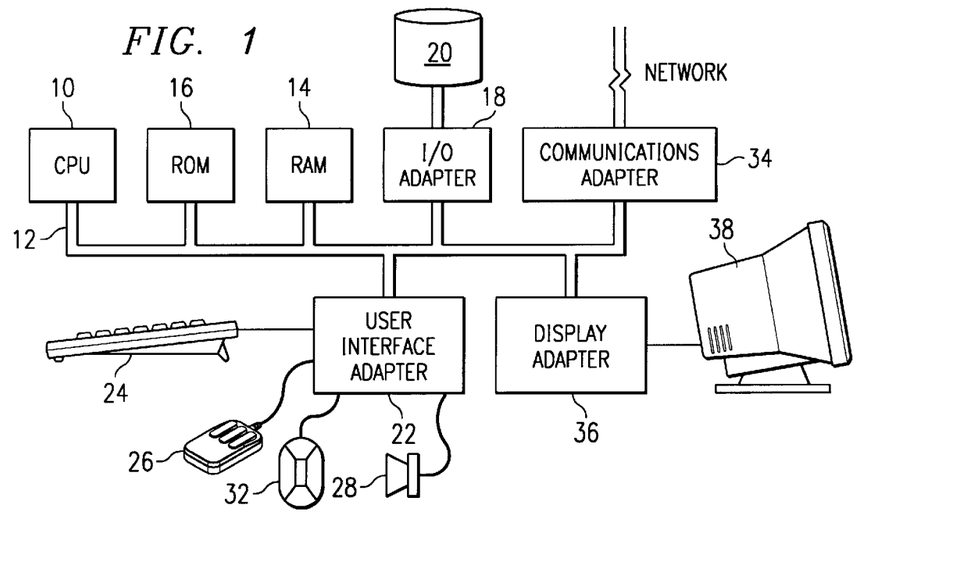
FIG. 1 is a block diagram of a data processing system capable of using a microprocessor embodying the present invention.

Referring to FIG. 1, a typical data processing system is shown which may be used in conjunction with the present invention. A central processing unit (CPU) 10 such as the Pentium II microprocessor, commercially available from Intel Corp. is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing system to communicate with other such systems, via the internet, local area network (LAN), or the like. Input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboards 24, trackball 32, or mouse 26 and receiving output from the system via speaker 28 and display 38. Additionally, an operating system, such as one of the versions of Windows, commercially available from Microsoft Corporation is used to coordinate the functions of the various components shown in FIG. 1.

Figure 2:
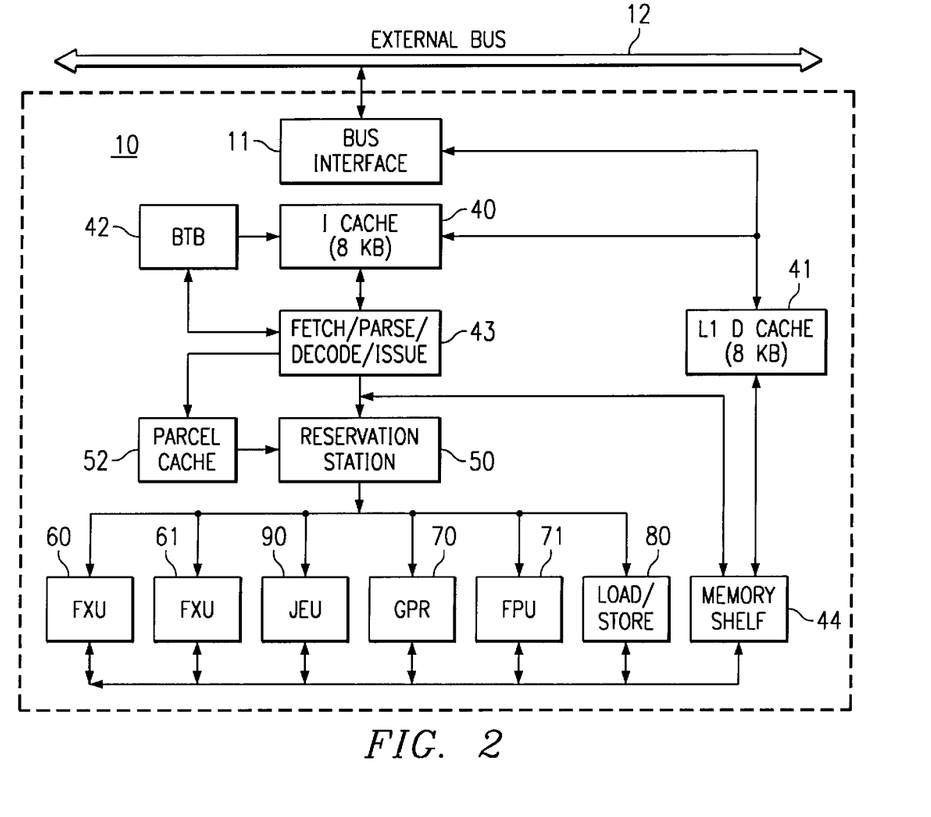
FIG. 2 is a block diagram of a microprocessor that includes the parcel cache which is used to store the decoded instructions, or parcels, in accordance with the present invention.

In FIG. 2, bus 12 is shown and interconnects microprocessor 10 to the various computer components in FIG. 1. It should be noted that for the sake of simplicity, microprocessor 10 will also be interchangeably referred to herein as CPU 10.

Bus interface unit (BIU) 11 interfaces the microprocessor components with system bus 12. Main memory 14 and the various input/output devices 26, 28, 32, via adapter 22, are also connected to bus 12. Control, address and data information is transmitted from microprocessor 10 onto bus 12 via BIU 11. Further, control, address and data signals from memory 14 and I/O adapter 22 are received by BIU 11 for use by microprocessor 10. It should be noted that the control, address and data information will include microprocessor instructions, as well as operand data which will be manipulated by the instructions.

Microprocessor 10, like most modern microprocessors, includes a hierarchical memory subsystem. The memory subsystem usually includes a level one (L1) instruction cache 40 and L1 data cache 41 which provide the instructions and data to the execution units (FPU 71, Integer Unit 60, 61, Jump Execution Unit 90 and Load/Store Unit 80). In many data processing systems, a level two (L2) cache (not shown) is provided. While an L2 cache is smaller than main memory 14, retrieving information for use by the processor from an L2 cache is much faster than loading the information from main memory. Main memory 14 is the last level of storage in the memory system. Memory 14 is typically the largest storage area, but also requires the greatest number of cycles to be accessed by the microprocessor.

More particularly, L1 instruction cache 40 is included in microprocessor 10, as shown in FIG. 2. After retrieving the instructions from main memory 14, cache 40 stores these microprocessor instructions that will be decoded and provided to the microprocessor execution units.

An L1 data cache 41 is also provided, as shown in FIG. 2, and may be configured to run in write-through mode, write-back mode, or the like. Write-through cache architectures require that all writes to the cache also update external memory simultaneously. A write-back architecture allows data to be written to the cache without updating external memory. With a write-back cache external write cycles are only required when a cache miss occurs, a modified line is replaced in the cache, or when an external bus master requires access to data. A typical L1 data cache uses a four-way set associative architecture and a least recently used (LRU) algorithm. Depending on the cache architecture, the line size of cache 16 may be 8 bytes, 16 bytes, 32 bytes, or the like, and new lines are only allocated during memory read cycles. Valid status is then maintained on a 16 byte cache line basis, but modified or "dirty" status for write-back mode is maintained on a 4-byte (double word) status. Therefore, only the double words that have been modified are written back to main memory when a line is replaced in the cache. The CPU can access the cache in a single internal clock cycle for both reads and writes. As noted above, instructions and data are stored separately in the L1 cache in order to increase performance.

Memory shelf 44 is essentially a memory queue that stores information after it has been received from the memory subsystem and prior to it being written from the execution units to the memory subsystem. Memory shelf 44 also includes a snooping mechanism that ensures coherency of data throughout the memory subsystem.

A branch target buffer 42 is used to predict the target address of control transfer instructions such as a "branch" or "jump" instruction. That is, the target address is precalculated (predicted) and stored in buffer 42. Thus, when an unconditional branch is taken, or a conditional branch instruction is encountered, the address for the next (non-sequential) instruction is already known and available for use by the corresponding execution unit (e.g. floating point or integer).

For example, a Pentium type microprocessor uses dynamic branch prediction. As each prefetched instruction is passed into the dual instruction pipelines, the memory address it was fetched from is used to perform a lookup in the BTB 42, which is a high-speed lookaside cache. If there is a branch and it misses BTB 42, it is predicted as not taken and the prefetch path is not altered. If a hit occurs in the BTB 42, then the state of history bits in BTB 42 are used to determine whether the branch should be predicted as taken or not taken. When the branch is executed, its results (whether it was taken or not and, if taken, the branch target address) are used to update BTB 42. The branch target buffer makes its predictions on the basis of basic blocks, i.e. block size, block type, target address and whether the branch will be taken or not taken. If the branch is incorrectly predicted, the instructions in the pipeline(s) and those which are currently-active and have been prefetched must be flushed.

Instruction cache 40 is connected to an instruction fetch/parse/decode/issue unit 43 and provides the decoded microprocessor instructions to reservation station 50 and ultimately to execution units 60, 61, 71, 80 and 90.

As noted by its name fetch/parse/decode/issue unit 43 performs several functions. First, it retrieves the microprocessor instructions and loads them into an internal buffer by "prefetching" them from the instruction stream prior to the actual fetch stage. As the fetched instructions are dispatched through the pipeline, new instructions are loaded into the buffer. This ensures that the execution units will always have a continuous supply of instructions and prevents any "bubbles" from occurring in the pipeline. Unit 43 also parses the complex instruction set computer (CISC) instructions into segments and identifies boundaries between the individual instructions. The parsed instructions are then decoded into reduced instruction set computer (RISC) instructions, also referred to herein as parcels or micro-ops, which are then placed in a decoded instruction queue 49 (FIG. 3) to be subsequently issued to the execution units. It should be noted that in some cases the CISC instructions will be translated into more than one RISC instruction. However, in other cases one CISC instruction will correspond to a single RISC instruction.

As noted above, in addition to being fetched by unit 43, the microprocessor instructions are also decoded and issued, or dispatched. From the fetch/parse/decode/issue unit 43, the decoded instructions are then provided to reservation station 50 which provides instructions to the execution units. Reservation station 50 may be, for example, approximately 20–24 entries deep and will store instructions which are awaiting execution on one of the execution units.

The microprocessor of FIG. 2 shows, as an example, five (5) execution units and includes two (2) fixed point units (FXU) having reference numerals 60, 61 respectively, which may also be referred to herein as integer units (IU). Integer instructions, such as add (ADD), multiply (IMUL), move (MOV) or the like are also issued by unit 43 to integer units 60, 61. In addition to executing other fixed point instructions and performing integer calculations, Integer units 60, 61 may perform address calculations for the load and store instructions.

Floating point unit 71 (FPU) performs the floating point operations and calculations that are often required for scientific and technical applications. Additionally, the floating point units execute the multimedia extensions (MMX) to the Intel architecture. Floating point unit 71 receives the issued floating point instructions from unit 43, via reservation station 50, for execution. Floating point unit 71 includes eight 80 bit registers with a 64 bit interface. The exemplary Intel architecture floating point unit 71 uses the x87 instruction set and is compatible with IEEE standard 754.

Load/store unit 80 is also included which is responsible for executing the load instructions which provide information (data and/or instructions) from the memory system to the microprocessor pipeline. Store instructions are also executed by unit 80 which write information from the microprocessor to the memory system. For example, load/store instructions are issued to load/store unit 80 for execution and memory address calculation, and to memory shelf 44, which may include a memory control unit, or the like, for scheduling. Load/store functions are implemented by load/store unit 80 which executes load and store instructions on one or more arithmetic logic units (ALU). Load/store unit 80 may include separate ALUs for load and store instructions. Load and store instructions include load string (LODS), load task register (LTR), move data (MOV), and the like. Store instructions include store task register (STR), store string (STOS), and the like. Generally, load instructions retrieve data and/or instructions from cache/memory and place the information in one of the microprocessor registers, while store instructions place data and/or instructions into a cache/memory location from the microprocessor registers. In some cases integer units 60, 61 may be used to perform memory address calculations.

A jump execution unit (JEU) 90 is also shown in FIG. 2, which is also often referred to as a branch execution unit. Jump execution unit 90 will process control transfer instructions such as branches, jumps and moves. Typically, when a jump instruction is encountered, JEU 90 will evaluate a condition code and jump to an out of sequence instruction based upon the state of the condition. In some cases the jump will occur if the condition is true, other times a branch will be taken when the condition is false. If the condition is such that the branch is not taken, then execution of instructions will continue sequentially. A typical jump, or branch instruction will include an opcode that describes the type of instruction, e.g. branch conditional, branch conditional to count register, delayed branch, jump on equal/zero, jump on not overflow, jump on parity even, or the like. The instruction also includes a field that specifies which bit in a condition register, or flag register (in the case of Intel architecture) is to be used for the condition of the jump, or branch. The target address is also included in the instruction such that if the condition is met, then the instruction stream jumps to the specified address for the next instruction to be executed.

The condition codes are bits in the condition register or flag register that are set during execution of other instructions. Generally, the condition codes include greater than, less than, equal to or overflow. When, for example, a compare instruction (CMP) is executed the "equal to" bit will be set to logical 1 when the contents of two registers are equal. The next jump on equal (JE) instruction will then look at the equal bit. If the "equal to" bit is a one, indicating that the contents of the compared registers were equal to one another, then the jump is taken and the next instruction is fetched from the target address in the jump instruction. If the equal bit is a logical zero, then the jump is not taken and the next instruction sequentially after the jump instruction is executed.

As seen in FIG. 2, the parcel cache of the present invention is shown by reference numeral 52. Parcel cache 52 is coupled to the fetch/parse/decode/issue unit 43 (decode unit 43). As described above, decode unit 43 receives the IA instructions from instruction cache 40. These complex instructions are then decoded into RISC micro-ops (parcels) and stored in parcel cache 52, using a least recently used (LRU) algorithm, or the like. During an instruction fetch cycle, parcel cache 52 is "looked up" in parallel with the instruction cache 40. If a parcel cache hit occurs, then the fetch from the instruction cache can be canceled and the parcel fetched from the parcel cache and provided to reservation station 50. In a preferred embodiment, the parcel cache 52 is kept relatively small and uncomplicated to minimize the time and logic required to retrieve the parcels.

The general purpose register file 70 is also shown in FIG. 2 and includes the general purpose registers (GPR) which are used by the application programmer to manipulate data structures and to hold the results of logical and arithmetic operations. The GPRs are all visible to the programmer (architected). That is, the operating system and/or application software written for the Intel ISA is capable of identifying and using the contents of the general purpose registers. In Intel ISA compatible microprocessors there are eight (8) GPRs: four (4) data registers (EAX, EBX, ECX, EDX); two (2) index registers (ESI, EDI) and two (2) pointer registers (ESP, EBP).

Memory management is provided by calculating a physical address from an effective address using a particular addressing mode. The CPU then uses the physical address to actually address specific locations in the physical memory device(s). A memory management unit may include a translation lookaside buffer, which is a cache for the paging mechanism. In a typical microprocessor, similar to the one shown in FIG. 2, the translation lookaside buffer (TLB) is a page table cache that automatically keeps the most commonly used page table entries in the processor. An address calculation unit is also provided for memory management operations and is used to calculate the physical address by computing an offset address (effective address). Generally, the effective address is calculated by adding together up to three values: a base, an index and a displacement. The base, if present, is the value in one of the 32 bit general registers at the time of the execution of the instruction. The index is also a value contained in one of the 32 bit general purpose registers. The index differs from the base in that the index is first multiplied by a scale factor of 1, 2, 4 or 8 before the summation is made. The third component added to the memory address calculation is the displacement, which is a value of up to 32 bits supplied as part of the instruction.

For additional information see the Intel Architecture Software Developer's Manual, Volume 2, Instruction Set Reference, published by Intel Corp., 1997; and Pentium Pro and Pentium II System Architecture, second edition, published by MindShare, Inc., 1998. Most microprocessor architectures include some type of branch instruction that ends a basic block of instructions. This basic block may be a set of iterative operations, e.g. a loop. It is often the case where the same set of instructions may be executed numerous times using different data, e.g. multiplying using multiple add and shift instructions. Microprocessor architectures have developed various instructions to address this issue. For example the PowerPC architecture (PowerPC is a trademark of IBM Corporation) uses a branch conditional to count register (BCCTR) instruction which decrements a counter and then branches based on the decremented value. The Intel ISA includes a LOOP instruction that uses one of the general purpose registers (ECX) as a counter and exits the loop when the value in the ECX register is equal to zero. Other repetitive type instructions, such as the repetitive load string (REP LODS) in the Intel ISA operate in a similar manner.

Figure 3:
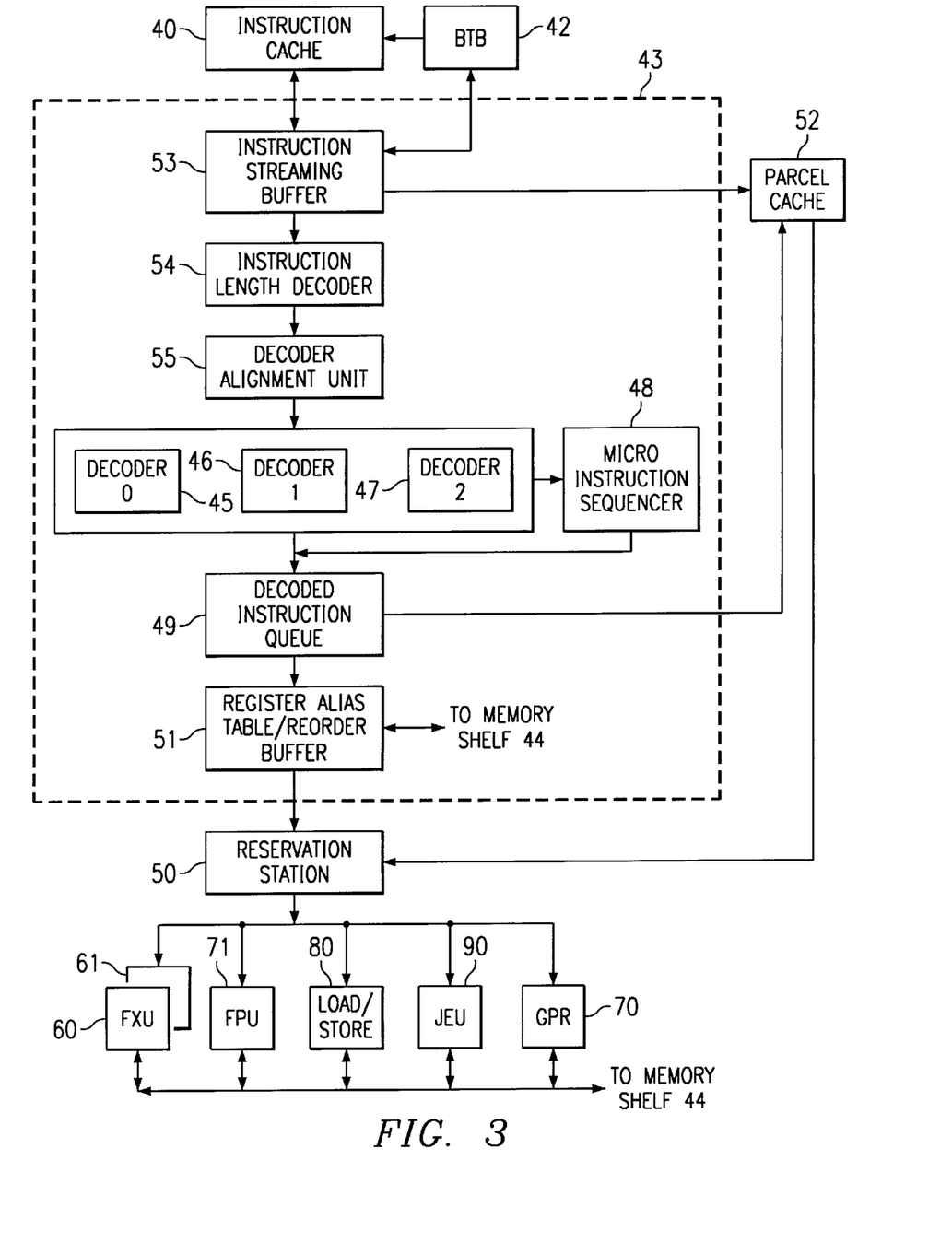
FIG. 3 is a more detailed block diagram of the decode unit of the microprocessor of FIG. 2 showing a preferred embodiment of the present invention wherein the microprocessor instructions are decoded into RISC micro-ops which are then stored in the parcel cache for later use.

The operation of the present invention will now be described with reference to FIG. 3 which shows a more detailed view of the fetch/parse/decode/issue unit 43, parcel cache 52 and branch target buffer 42. Further, it can be seen that the decode pipeline of microprocessor 10 includes five (5) stages. During the first stage, the microprocessor instruction is fetched from instruction cache 40 and placed in instruction streaming buffer 53. More particularly, a 32 byte line is loaded from cache 40 into prefetch streaming buffer 53. At stage two (2), the instruction length decoder unit 54 marks the boundaries for the fetched instruction. Normally, two operations are performed: (1) the boundaries between instructions within a 16-byte block are identified; and (2) if any of the instructions within the 16-byte block are branches, the memory addresses that they were fetched from are presented to BTB 42 for branch prediction.

At stage three (3) the fetched and marked instructions are aligned by decoder alignment unit 55 for presentation to the appropriate decoders. Three (3) decode units (decoder 0, decoder 1, decoder 2) 45, 46, 47 are shown along with micro instruction sequencer unit 48. During the fourth decode stage, between one and three instructions are submitted to decoders 45, 46, 47 for translation into micro-ops. In one embodiment, decoder 0 is a complex decoder that can decode any instruction not greater than seven bytes and that translates into no more than four micro-ops. Decoders 1 and 2 are simple decoders that can decode instructions not greater than seven bytes in length and translate into a single micro-op. It can be seen that depending on the type of instruction, up to three instructions can be decoded at the same time.

Some instructions will translate into more than four micro-ops and cannot be handled by decoder 0. These instructions are submitted to the micro instruction sequencer (MIS) unit 48 for translation. Basically, MIS 48 is a microcode ROM that contains the series of micro-ops (five or more) associated with each very complex instruction. Some instructions may translate into extremely large repetitive micro-op sequences.

At stage five (after translation by decoders 45, 46, 47 or MIS 48), the micro-ops are placed in the decoded instruction queue 49. The decoded instruction queue can hold up to six (6) micro-ops to handle the scenario where an instruction that translates into four micro-ops is input to complex decoder 0 and instructions that translate into single micro-ops are input to simple decoders 1 and 2. This situation will yield six parallel micro-ops.

Register alias table/reorder buffer 51 includes a table that allows 40 hidden registers to be accessed and used by the micro-ops. The register alias table (RAT) will adjust the source fields of the micro-ops to select which of the 40 registers in the reorder buffer (ROB) are to be used. This mechanism essentially allows the eight (8) general purpose registers to be increased which will increase microprocessor performance.

After RAT/ROB unit 51 the micro-ops are provided to reservation station 50 and sent to the execution units for processing. Results generated by the execution of the micro-ops are then provided to GPR file 70, ROB 51 or memory (data cache 41).

To increase performance of a microprocessor, the present invention provides a mechanism for bypassing the five fetch and decode stages on the front end of the microprocessor pipeline. In a preferred embodiment parcel cache 52 is provided and coupled to decode unit 43. Decoded instruction queue 49 is interconnected to parcel cache 52 such that decoded instructions (parcels) can be loaded from queue 49 into parcel cache 52. The parcel cache will be maintained using an LRU algorithm, or the like. That is, upon system startup, the first decoded instructions through the pipeline will be loaded into parcel cache 52. Once the cache is full, those decoded instructions which are used the most infrequently will be the ones that are first to be replaced. Instruction streaming buffer 53 is also interconnected to parcel cache 52 such that the instruction cache 40 and parcel cache 52 can be looked up in parallel. When a "hit" occurs on parcel cache 52, the parcel is then provided to reservation station 50, bypassing the decode pipeline stages.

In a preferred embodiment, parcel cache 52 is relatively small in size to reduce complexity, as well as minimize look up time. For example, the parcel cache 52 may be sixteen (16) entries, which is approximately two kilobyte of memory space. In addition the parcel cache can be addressed using linear addressing techniques to maintain consistency with the addressing mode used by decode unit 43 and BTB 42. In this manner, the need for additional logic and processing time to perform address translations from linear to virtual to physical is eliminated.

The parcel cache can also be coupled to the branch prediction logic in BTB 42, since the target branch address prediction logic also uses linear addressing. Further, in a manner similar to the instruction cache, a single port cache is contemplated for use as a preferred embodiment in order to further reduce complexity and implementation costs, along with a corresponding reduction in look up time.

While a preferred embodiment uses a small cache size with no required address translation, the present invention contemplates a larger multiport parcel cache that could use virtual addressing and the associated address translation mechanism.

One microprocessor instruction that can take advantage of the parcel cache of the present invention is the LOOP instruction of the Intel ISA. However, it should be understood that the use of the parcel cache by other microprocessor instructions is contemplated by the scope of the present invention.

As noted above, a LOOP instruction will decrement a count register and then jump to a target address based on the value in the count register. That is, the target address will be accessed for non-zero values and the loop will be exited when the count register is zero.

The LOOP instruction will be translated into decrement and jump micro-ops by decode unit 43. More specifically, a DEC ECX (ECX=ECX−1) and a JECXZ (jump when ECX= 0) will be output by decode unit 43. The JECXZ micro-op will be required to check every bit of the 32 bit ECX register in order to determine if the value in the register is zero. It is possible that the most significant bit (MSB) could be a "1" with the remaining bits all equal to zero. In this case JECXZ would check the first 31 bits and find that all zeros are present, however, the presence of a "1" in the MSB location will cause the branch not to be taken, i.e. the jump instruction will cause the loop to be continued.

In accordance with a preferred embodiment of the present invention, decode 43 will cause DEC (decrement), CMP (compare), JECXZ (jump when ECX=0) and the like micro-ops to be generated. As noted above, it is possible that $2^{32}$ iterations through the loop could occur. For conventional systems each of these iterations will cause the LOOP instruction to traverse the five decode pipeline stages which requires a great deal of processing resources. The parcel cache 52 of the present invention will store the DEC, CMP, JECXZ micro-ops such that for each iteration of the LOOP, these parcels can be forwarded from the parcel cache to reservation station 50, thus bypassing the five decode pipeline stages and avoiding the necessity to decode the LOOP instruction during each iteration. This will free up the decode pipeline to translate other CISC instructions in the instruction stream into their associated micro-ops.

It should be noted that the present invention contemplates providing parcels to decoded instruction queue 49, RAT/ROB 51 or other pipeline stage. However, the preferred embodiment sends parcels to the reservation station 50 which results in a saving of approximately six (6) machine cycles when compared to parcels provided to decoded instruction queue 49.

The present invention will be further described with reference to FIG. 4. Instruction cache 40 is shown with a number of cache lines that include an address portion 100 and instruction store portion 101. Also, shown is address translation and comparison logic 102. Prefetch unit 53, described above, includes a linear address generator 108 that is used to index into, or "look up" instruction cache 40. That is, when a specific instruction is desired by one of the execution units, prefetch 53 generates a linear address which indexes into cache 40 to determine if the desired microprocessor instruction is located in the cache. Address translation and comparison logic 102 includes a translation lookaside buffer (TLB) that translates the 32 bit linear address into a 36-bit physical memory address. The comparison logic is used to determine whether the translated address is the same as an address stored in cache 40, i.e. it determines whether the generated address hits or misses the cache. When a memory (including cache) access is necessary, the 32 bit memory address generated by adding the segment base address and the 32 bit segment offset to each other produces a 32 bit address (linear address). Those skilled in the art will understand that memory is organized on the basis of 4 KB pages. A page directory and page table are used to translate a linear address to a physical address.

Normally, each entry in the page directory contains the base address of a page table and each entry in that page table contains the base physical address of a target base in memory.

In Pentium class processors each page directory and page table entry is 32 bits wide with a 20 bit field to identify the aligned base physical memory address of a page table or actual page in memory. The lower 12 bits of the linear address is concatenated to the lower end of this 20 bit field to create the exact address of one of the locations within the target physical 4 KB page.

It should be noted that when the processor paging mechanism is disabled, the linear address will be the same as the physical address where the information is actually stored.

The parcel cache of the present invention is essentially a small buffer. This cache is addressed using a linear address. The TLB is used to translate the linear address into a corresponding physical address. Since the address generator 108 in the prefetch unit 53 is already using a linear address, a preferred embodiment of the parcel cache will use linear addressing as well. By using linear addressing one or more cycles will be saved and avoid creating a critical path. This allows higher frequencies to be realized. Further, by keeping the parcel cache small, the access time is minimized and the chance of parcel cache look up becoming a critical path is reduced.

Returning to FIG. 4, linear address generator 108 of prefetch unit 53 is also used to index into branch target buffer 42. This buffer includes entries having an addressing portion 105, target address portion 103 and history portion 106. BTB 42 is used by the processor to predict whether a branch (jump) will be taken. When, for example, prefetch 53 retrieves a jump microprocessor instruction such as JNZ, cc, XXXX (jump not zero, condition code, target address) from instruction cache 40, a look up is performed into BTB 42 at the address from which the jump was retrieved. In this example, the address in cache 40 from which the jump was fetched is BBBB. This address is used to index into BTB 42. If a miss occurs, then the branch is predicted as not taken, i.e. the next instruction after the jump is retrieved from the instruction stream, not the target address. However, if the address from which the jump was fetched is in the BTB, then a hit occurs and the history bits 106 are used to determine if the branch should be predicted as taken or not taken. When the branch is executed, its results (taken or not taken, and the target address if taken) are used to update the target address and history bits in BTB 42. BTB 42 also includes address translation and compare logic 107 to map the linear address provided by prefetch unit 53 into a physical address in the branch target buffer and determine whether a hit or miss occurs based on that address.

In a preferred embodiment of the present invention, parcel cache 52 includes address translation and compare logic 112 similar to logic 102 and 107 in the instruction cache and BTB, respectively. This will allow the parcel cache to be looked up (searched) in parallel with the instruction cache 40. The independent execution units of the microprocessor of the present invention provide for instruction fetching to be carried out speculatively. The execution units correct any mispredicted branches. Hence, the fetching mechanism (e.g. prefetch unit 53) will automatically look in both instruction cache 40 and parcel cache 52 for the desired instructions and/or parcels.

In order to save silicon area it is also contemplated that the parcel cache could utilize the address and comparison logic 107 of BTB 42 in order avoid redundant logic. That is, the linear address could be provided from address generator 108 to logic 102 in cache 40 and logic 107 in BTB 42, which in turn could provide the physical address back to parcel cache 52 for indexing (look up).

Parcel cache 52 includes entries having at least an address portion 109 and micro-op portion 110. When a parcel cache hit occurs, the micro-op is provided to the reservation station 50, bypassing the fetch/decode pipeline stages.

The present invention will now be described using a specific example of the "repeat" type of instruction that can take advantage of the present invention. These instructions include those Intel ISA instructions that begin with the REP prefix. The repeat load string instruction (REP LODS AL) will be used to illustrate one advantage of the present invention.

Figure 4:
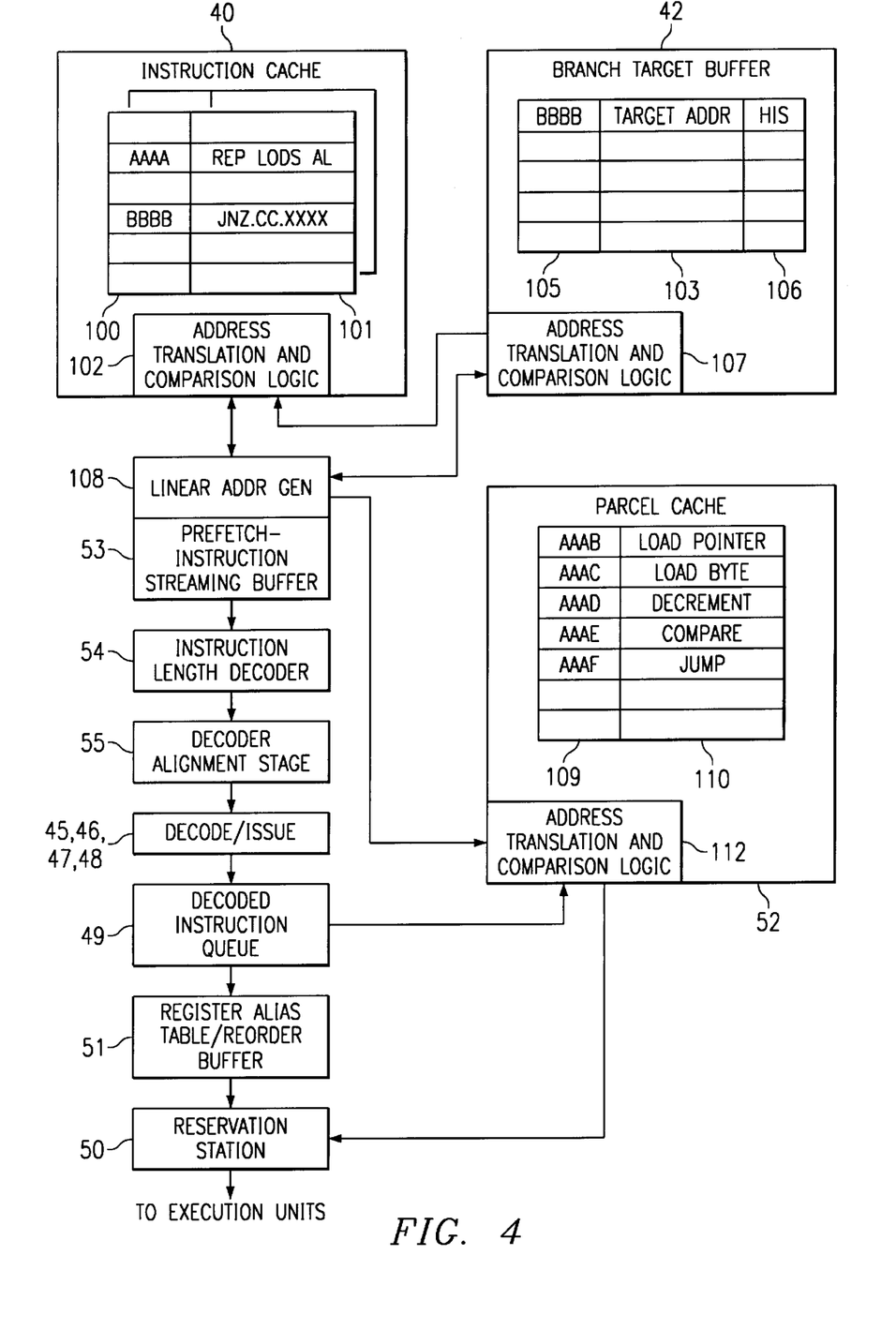
FIG. 4 is another block diagram illustrating the prefetch unit, the parcel cache and decoded instruction queue to show the mechanism for looking up the parcel cache and transferring parcels to bypass the decode pipeline.

In FIG. 4, the REP LODS AL microprocessor instruction (CISC) is shown in instruction cache 40 at address AAAA. This repeat instruction is then fetched by unit 53 and parsed by instruction length decoder unit 54, aligned by alignment stage 55 and translated into its associated RISC parcels by one of decode units 45, 46, 47 or micro-instruction sequencer 48. Once the REP LODS AL instruction is decoded, the parcels are issued to decoded instruction queue 49 to be provided to the reorder buffer, reservation station and ultimately to the execution units.

In accordance with the present invention, when the parcels are provided to the decoded instruction queue, they are also sent to parcel cache 52. Logic 112 maps these parcels into addressable locations in the parcel cache. As noted previously, the parcel cache will be relatively small having, in a first preferred embodiment, approximately 16 entries and being 2 KB in size. At initialization the first 16 parcels will all be stored in cache 52. Subsequently, an LRU algorithm or the like will replace those parcels which have remained unused in the cache for the longest time.

Returning to the present example, a REP LODS AL microprocessor instruction will translate into LOAD POINTER, LOAD BYTE, DECREMENT, COMPARE, JUMP parcels. When these micro-ops are provided to decoded instruction queue 49 they are also stored in parcel cache 52. The REP LODS AL instruction is microcoded to operate in the following manner.

1. LOAD POINTER—load the pointer value SI into a temporary register T1.

2. LOAD BYTE—generate a load byte RISC operation using SI as a pointer.

3. DECREMENT—decrement the (E)CX register by one. This decrementing is carried out by a decrementer in one of the arithmetic logic units, i.e. fixed point units 60, 61.

4. COMPARE—determine if the value in the (E)CX register is equal to zero.

5. JUMP—jump to the next instruction when (E)CX equal zero, else repeat micro-ops 1–4.

Due to the potentially large size of the count value in the count register ($2^{16}$ for CX and $2^{32}$ for ECX), it can be seen that these parcels are likely to be repeated many times during execution of the REP LODS AL instruction.

The present invention provides the decoded parcels to the appropriate execution units and also provides them to parcel cache 52. In this manner, the decoded parcels are available while the repeat load string operation is occurring. Typically, the target address of the jump instruction will be the location of the REP LODS AL microprocessor instruction in instruction cache 40. This CISC instruction will then need to be fetched, decoded, issued, and the like. The target address of the jump instruction is always linear and remains linear while it is stored in the parcel cache.

In accordance with the present invention, the association of the REP LODS AL instruction is mapped to the related parcels, hence, the jump micro-op in parcel cache 52 at address AAAF will point to the load pointer parcel in cache 52 at address AAAB. In this manner only the decoded parcels will be used for each iteration required to perform the load string operation, i.e. until (E)CX equals zero. More particularly, when the jump parcel is generated from the REP LODS AL instruction the target address will normally be the address of the REP LODS AL instruction. However, the present invention provides a pointer from the REP LODS AL instruction to the parcel cache address containing the load pointer parcel such that the repetitive parcels will be those predecoded micro-ops included in the parcel cache.

The parcels associated with the REP LODS AL instruction can be scheduled speculatively (out of order) and if the last jump does not point to the linear address corresponding to the load pointer parcel associated with the REP LODS AL instruction, the previous instructions are flushed naturally by the branch prediction logic. That is, when the count register does equal zero the jump target address will not point to REP LODS AL (mapped to the load pointer parcel in parcel cache 52) indicating that the repeat operations are completed. Thus, the branch misprediction logic will flush the parcels since the jump is not taken.

As an additional example, the execution of a repetitive move data microprocessor instruction, such as REP MOVS will now be described. Processing this complex microprocessor instruction will create an inner loop that will repeat until a null value (zero) is found.

The following example shows an example of an inner loop of a program trying to find a null value:

```
            shl ecx, 2              ;set ecx with a value
MOVE_DATA:  mov dl, [eax + 01H]     ;move data in dl register
            xor ecx, ebx            ;perform an exclusive or
                                    compute operation
            inc eax                 ;increment the pointer address
            test dl, dl             ;check if the value is zero
            jne MOVE_DATA           ;jump to MOVE_DATA if dl is
                                    not zero
```

In the above program, the inner loop starts by setting up an initial value in the ECX register. The corresponding data byte is moved to the DL register using EAX as a pointer. A compute operation is performed after loading the data in the DL register. The pointer is incremented to get the next data byte and the process is repeated until a zero value is found. As shown, the jump not equal instruction includes a target address that branches to the MOVE_DATA instruction which is associated with the mov dl [eax+01H] instruction.

The above program is translated by the decode pipeline of the processor as follows:

```
            shl ecx, 2              ;set ecx with a value
MOVE_DATA:  ld dl, [eax + 01H]      ;load dl register
            xor ecx, ebx            ;perform XOR compute
                                    operation
            inc eax                 ;increment the pointer address in
                                    the eax register
            and dl, dl              ;perform AND compute
                                    operation
            jnz MOVE_DATA           ;jump to MOVE_DATA when
                                    ecx not zero
```

The above loop is executed several times. The translated program parcels shown above are stored in the parcel cache 52. As soon as the fetch unit hits in the parcel cache, the decoded instructions from the parcel cache are issued to the reservation station. This avoids any fetch and decode cycles. As seen above, the jump not zero parcel has as its target address the MOVE_DATA instruction which is now associated with (points to) the load dl [eax+01H] parcel. In this manner the program inner loop is processed solely by those parcels which are present in the parcel cache.

During the initial decode of the REP MOVS microprocessor instruction a pointer such as a bit or group of bits is set. This will cause the target address of the jump instruction to effectively be mapped back to the first parcel in the group of repeated instructions, i.e. load dl. In particular, the target address of the jump will be the address of the MOVE_DATA, however, this microprocessor instruction will then point to the address in the parcel cache 52 where the load dl instruction is stored. Thus, the jump instruction (jnz) is mapped to the parcel cache address for the target parcel (Id dl).

Those skilled in the art will understand how the present invention as described herein can minimize the amount of processing resources needed to execute various instructions, particularly those which utilize loop or repeat operations as in the LOOP and REP instructions of the Intel ISA.

Although certain preferred embodiments have been shown and described, it should be understood that many changes and modifications may be made therein without departing from the scope of the appended claims.

What is claimed is:

1. A microprocessor that processes microprocessor instructions, comprising:

an instruction cache for storing at least one said microprocessor instruction;

a decode pipeline for translating said microprocessor instruction into at least one corresponding decoded parcel; and a parcel cache for storing said corresponding decoded parcel when said microprocessor instruction is translated;

wherein said decode pipeline is bypassed by providing said corresponding decoded parcel from said parcel cache to at least one execution unit when said microprocessor instruction is to be processed and said corresponding decoded parcel is present in said parcel cache, said microprocessor instruction translating into a plurality of interdependent decoded parcels which are iteratively executed by said at least one execution unit, wherein at least one of said interdependent decoded parcels includes a control transfer parcel that branches to said microprocessor instruction when a particular condition is met, said microprocessor instruction pointing to a target one of said interdependent decoded parcels, wherein said interdependent decoded parcels are provided to said at least one execution unit from said parcel cache without said microprocessor instruction being decoded for each iterative execution of said interdependent decoded parcels.

2. A microprocessor according to claim 1 wherein said decode pipeline comprises a fetch unit for searching said instruction cache and said parcel cache in parallel for said microprocessor instruction and said corresponding decoded parcel, respectively.

3. A microprocessor according to claim 2 wherein said microprocessor comprises a reservation station for providing said corresponding decoded parcel to said at least one execution unit.

4. A microprocessor according to claim 3 wherein said search of said instruction cache for said microprocessor instruction is canceled when said corresponding decoded parcel is found in said parcel cache.

5. A microprocessor according to claim 4 wherein said corresponding decoded parcel is provided to said reservation station when said search of said parcel cache, by said fetch unit, results in said corresponding decoded parcel being found in said parcel cache.

6. A microprocessor that processes complex microprocessor instructions, comprising:

an instruction cache for storing at least one said complex microprocessor instruction;

a decode pipeline for translating said complex microprocessor instruction into a plurality of interdependent decoded parcels including a control transfer parcel that branches to said complex microprocessor instruction when a particular condition is met;

at least one execution unit for iteratively processing said interdependent decoded parcels;

a parcel cache for storing said interdependent decoded parcels when said complex microprocessor instruction is translated;

means for bypassing said decode pipeline by providing said interdependent decoded parcels from said parcel cache to at least one execution unit when said complex microprocessor instruction is to be processed and said interdependent decoded parcels are present in said parcel cache; and means for causing said complex microprocessor instruction to point to a target one of said interdependent decoded parcels wherein said interdependent decoded parcels are provided to said at least one execution unit from said parcel cache without said complex microprocessor instruction being decoded for each iterative execution of said interdependent decoded parcels.

7. A method of processing microprocessor instructions in a data processing system having at least one microprocessor, comprising the steps of:

storing, in an instruction cache, at least one said microprocessor instruction;

translating, by a decode pipeline, said microprocessor instruction into at least one corresponding decoded parcel, wherein said step of translating comprises the step of translating said microprocessor instruction into a plurality of interdependent decoded parcels which are iteratively executed by at least one execution unit;

storing said corresponding decoded parcel, in a parcel cache, when said microprocessor instruction is translated;

providing a control transfer parcel as at least one of said interdependent decoded parcels that branches to said microprocessor instruction when a particular condition is met; and pointing, by said microprocessor instruction, to a target one of said interdependent decoded parcels;

wherein said decode pipeline is bypassed by providing said corresponding decoded parcel from said parcel cache to at least one execution unit when said microprocessor instruction is to be processed and said corresponding decoded parcel is present in said parcel cache, wherein at least one of said interdependent decoded parcels is provided to said at least one execution unit from said parcel cache without said microprocessor instruction being decoded for each iterative execution of said interdependent decoded parcels.

8. A method according to claim 7 wherein said step of translating comprises the step of searching, by a fetch unit in said decode pipeline, said instruction cache and said parcel cache in parallel for said microprocessor instruction and said corresponding decoded parcel, respectively.

9. A method according to claim 8 further comprising the step of providing a reservation station in said microprocessor for storing said corresponding decoded parcel and transmitting said corresponding decoded parcel to said at least one execution unit.

10. A method according to claim 9 wherein said step of translating further comprises the step of canceling said search of said instruction cache for said microprocessor instruction when said corresponding decoded parcel is found in said parcel cache.

11. A method according to claim 10 further comprising the step of providing said corresponding decoded parcel to said reservation station when said search of said parcel cache, by said fetch unit, results in said corresponding decoded parcel being found in said parcel cache.

* * * * *